United States Patent
Chang (10) Patent No.: US 7,995,153 B2
(45) Date of Patent: Aug. 9, 2011

(54) IMAGE PROCESSING SYSTEM CAPABLE OF CHANGING A POLARIZATION ANGLE OF A POLARIZED IMAGE AND RELATED METHOD

(75) Inventor: Yao-Tsung Chang, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 323 days.

(21) Appl. No.: 12/466,368

(22) Filed: May 14, 2009

(65) Prior Publication Data
US 2010/0060810 A1 Mar. 11, 2010

(30) Foreign Application Priority Data
Sep. 11, 2008 (TW) .............................. 97134826 A (51) Int. Cl.
*G02F 1/1335* (2006.01)
(52) U.S. Cl. .......................................... 349/15; 349/14
(58) Field of Classification Search ................ 349/14, 349/15
See application file for complete search history.

(56) References Cited

U.S. PATENT DOCUMENTS

| | | | |
|---|---|---|---|
| 6,816,207 B2 * | 11/2004 | Jung | 349/15 |
| 7,612,833 B2 * | 11/2009 | Kim | 349/15 |
| 7,796,200 B2 * | 9/2010 | Chen et al. | 349/15 |
| 7,916,223 B2 * | 3/2011 | Kitagawa et al. | 349/15 |
| 2004/0036821 A1 * | 2/2004 | Paukshto et al. | 349/74 |
| 2006/0215262 A1 * | 9/2006 | Kim | 359/465 |
| 2008/0094545 A1 * | 4/2008 | Ko | 349/96 |
| 2009/0225243 A1 * | 9/2009 | Kim et al. | 349/15 |

* cited by examiner

*Primary Examiner* — Rhonda Peace
(74) *Attorney, Agent, or Firm* — Winston Hsu; Scott Margo (57) ABSTRACT

An image processing system includes a display device, a liquid crystal module, and a control device. The display device is used for outputting a first set of images and a second set of images. The first set of images and the second set of images have different visual angles. The liquid crystal module is disposed at a side of the display device. The control device is electrically coupled to the display device and the liquid crystal module. The control device includes a power source and a control unit. The control unit is electrically coupled to the power source for controlling whether the power source should input an electric field to a twisted nematic liquid layer of the liquid crystal module or not.

22 Claims, 6 Drawing Sheets

IMAGE PROCESSING SYSTEM CAPABLE OF CHANGING A POLARIZATION ANGLE OF A POLARIZED IMAGE AND RELATED METHOD

BACKGROUND OF THE INVENTION

1. Field of the Invention

The present invention relates to an image processing system and related method, and more particularly, to an image processing system capable of changing a polarization angle of a polarized image and related method.

2. Description of the Prior Art

Generally, stereoscopic images are transmitted as left eye images and right eye images viewed by the left eye and the right eye, respectively. The images received by the two eyes are matched as a stereoscopic image that has focal range and gradation according to a discrepancy between visual angles of the two eyes. Some common means utilized for generating the stereoscopic images include polarizing glasses, shutter glasses, an anaglyph, and an auto-stereoscopic display.

Polarizing glasses utilize a horizontal polarization lens and a vertical polarization lens disposed on the left lens and the right lens of a pair of glasses, respectively, so that the user's left eye and right eye only view horizontally polarized beams and vertically polarized beams, respectively. The display apparatus sequentially projects the horizontally polarized beams and the vertically polarized beams for reception by the left eye and the right eye, respectively, and then the stereoscopic images are matched by vision persistence in the user's brain. As mentioned above, the images outputted by the display apparatus must be modulated by polarization processing, so as to achieve the purpose of sequentially projecting the horizontally polarized beams and the vertically polarized beams that are received by the horizontal polarization lens and the vertical polarization lens, respectively. However, optical mechanisms for modulating polarized beams in the prior art are too complicated and have limited application to polarizing glasses. Thus, design of convenient polarizing glasses for easy application as the stereoscopic image display apparatus is an important issue in the stereoscopic display industry.

SUMMARY OF THE INVENTION

It is therefore a primary objective of the claimed invention to provide an image processing system comprising a display device for outputting a first set of images and a second set of images sequentially, the first set of images and the second set of images being of different visual angles but same polarization angles after being output by the display device; a liquid crystal module disposed on a side of the display device where the first set of images and the second set of images are outputted, the liquid crystal module comprising a twisted nematic liquid crystal layer; a first transparent electrode structure disposed on a first side of the twisted nematic liquid crystal layer; and a second transparent electrode structure disposed on a second side of the twisted nematic liquid crystal layer; and a control device electrically coupled to the liquid crystal module and the display device, the control device comprising a power source electrically coupled to the first transparent electrode structure and the second transparent electrode structure; and a control unit electrically coupled to the power source for controlling the power source to input an electric field to the two transparent electrode structures for passing the first set of images impartially through the twisted nematic liquid crystal layer, and stopping the power source from inputting an electric field to the two transparent electrode structures for offsetting the polarization angles of the second set of images by 90 degrees after passing through the twisted nematic liquid crystal layer.

It is therefore a primary objective of the claimed invention to further provide a method comprising outputting a first set of images and a second set of images of different visual angles to a liquid crystal module sequentially, the first set of images and the second set of images having same polarization angle after output; inputting an electric field to the liquid crystal module for passing the first set of images impartially through the liquid crystal module; and stopping inputting the electric field to the liquid crystal module for modifying the polarization angle of the second set of images by 90 degrees after passing through the liquid crystal module.

It is therefore a primary objective of the claimed invention to further provide a liquid crystal display device used for outputting a first set of images and a second set of images sequentially, the first set of images and the second set of images having different visual angles, respectively, but same polarization angles after being output by the liquid crystal display device; a liquid crystal module disposed on a side of the liquid crystal display device where the first set of images and the second set of images are outputted, the liquid crystal module comprising a twisted nematic liquid crystal layer; a transparent electrode structure disposed on a first side of the twisted nematic liquid crystal layer; and a first transparent electrode layer connected to a second side of the twisted nematic liquid crystal layer; and a control device electrically coupled to the liquid crystal module and the liquid crystal display device, the control device comprising a power source electrically coupled to the first transparent electrode layer and the transparent electrode structure; and a control unit electrically coupled to the power source for controlling the power source to input an electric field to the first transparent electrode layer and the transparent electrode structure for passing through the first set of images through the twisted nematic liquid crystal layer impartially, and for stopping input of the electric field from the power source to the first transparent electrode layer and the transparent electrode structures for offsetting the polarization angles of the second set of images by 90 degrees after passing through the twisted nematic liquid crystal layer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
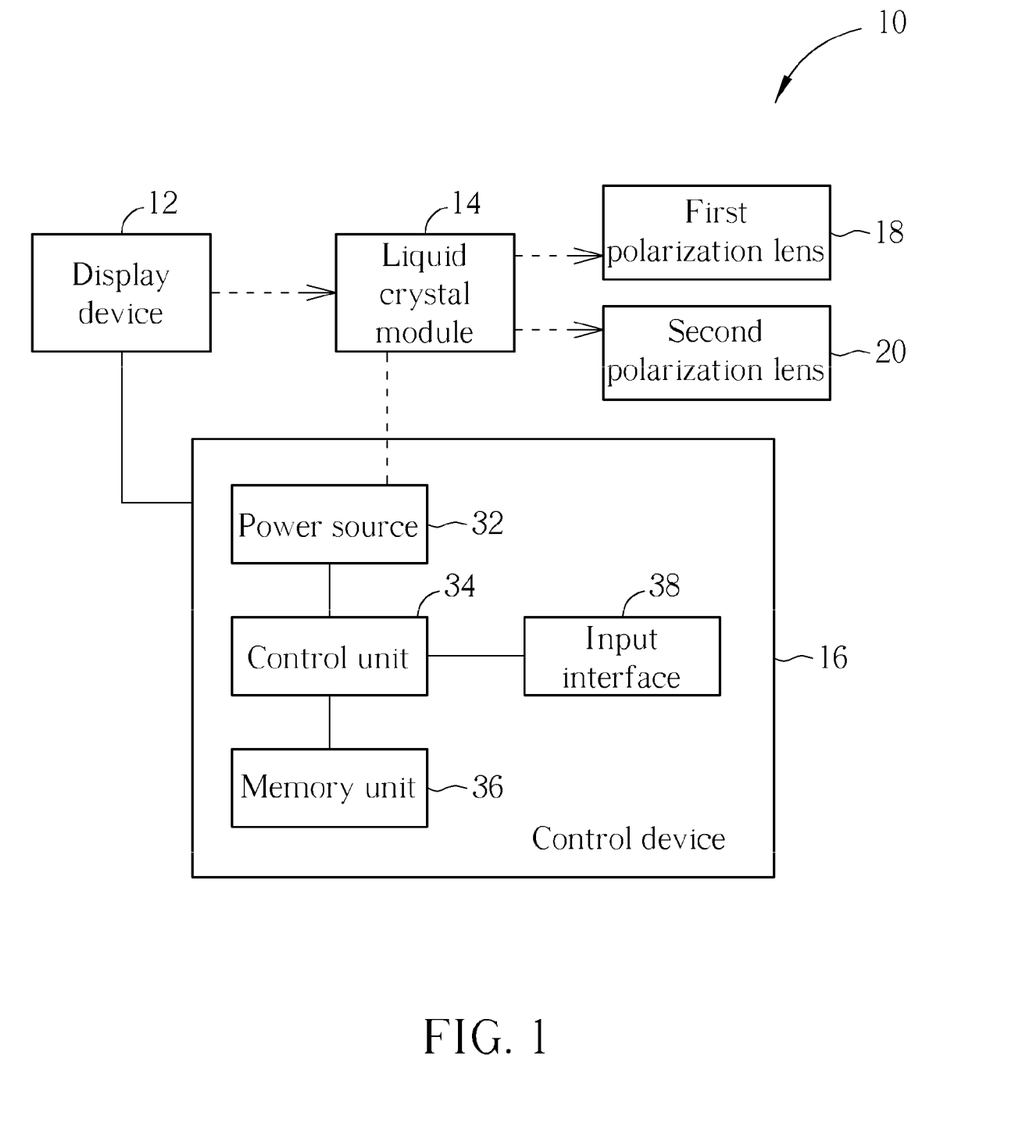
FIG. 1 is a block diagram of a function of an image processing system according to a first embodiment of the present invention.
Figure 2:
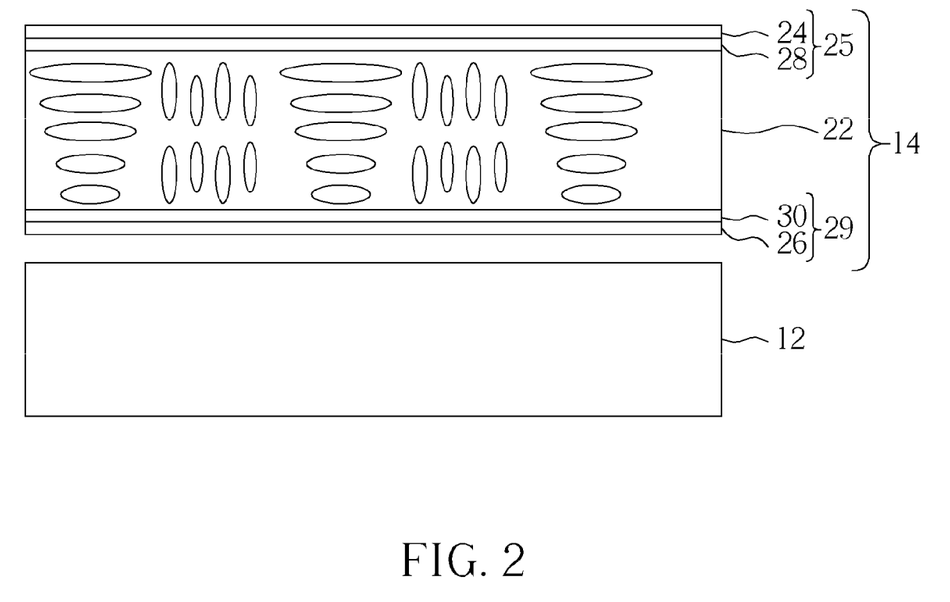
FIG. 2 is a diagram of a disposition of a display device and a liquid crystal module in FIG. 1.

Please refer to FIG. 1. FIG. 1 is a block diagram of a function of an image processing system 10 according to a first embodiment of the present invention. The image processing system 10 comprises a display device 12, a liquid crystal module 14, a control device 16, a first polarization lens 18, and a second polarization lens 20. The display device 12 is used for outputting a first set of images and a second set of images sequentially. The first set of images and the second set of images have different visual angles but same polarization angles after output by the display device 12. Please refer to FIG. 2 in conjunction with FIG. 1. FIG. 2 is a diagram of disposition of the liquid crystal module 14 and the display device 12 according to FIG. 1. As shown in FIG. 2, the liquid crystal module 14 is disposed on a side of the display device 12 where the first set of images and the second set of images are outputted. FIG. 2 shows the liquid crystal module 14 comprising a twisted nematic liquid crystal layer 22, a first transparent electrode structure 25, and a second transparent electrode structure 29. The first transparent electrode structure 25 comprises a first transparent base 24 and a first transparent electrode layer 28. The first transparent base 24 is disposed on a side of the twisted nematic liquid crystal layer 22, and the first transparent electrode layer 28 is disposed between the twisted nematic liquid crystal layer 22 and the first transparent base 24. The second transparent electrode structure 29 comprises a second transparent base 26 and a second transparent electrode layer 30. The second transparent base 26 is disposed on a side of the twisted nematic liquid crystal layer 22, and the second transparent electrode layer 30 is disposed between the twisted nematic liquid crystal layer 22 and the second transparent base 26. The first transparent base 24 and the second transparent base 26 can be composed of transparent materials, such as glass or a plastic. The first transparent electrode structure 25 and the second transparent electrode structure 29 as mentioned above can either be a combination of two of the above structure elements (such as the transparent base and the transparent electrode layer), or may be designed as a single layer element, such as a single transparent electrode layer. Type of the structure designed may be adapted for requirements of actual processes. Please refer to FIG. 1 and FIG. 2 at the same time. The control device 16 electrically coupled to the display device 12 and the liquid crystal module 14 comprises a power source 32, a control unit 34, a memory unit 36, and an input interface 38. The power source 32 is electrically coupled to the first transparent electrode layer 28 and the second transparent electrode layer 30. The control unit 34 is electrically coupled to the power source 32 for controlling the power source 32 to input an electric field to the first transparent electrode layer 28 and the second transparent electrode layer 30 for passing the first set of images impartially through the twisted nematic liquid crystal layer 22, and for stopping the power source 32 from inputting an electric field to the first transparent electrode layer 28 and the second transparent electrode layer 30 for offsetting the polarization angles of the second set of images by 90 degrees after passing through the twisted nematic liquid crystal layer 22. The memory unit 36 is electrically coupled to the control unit 34 for storing the first set of images and the second set of images. The input interface 38 is electrically coupled to the control unit 34 for supplying an input signal. Thus, while the user inputs an order for viewing a flat image or a stereoscopic image through the input interface 38, a relative input signal is generated and transmitted from the input interface 38 to the control unit 34. The control unit 34 controls the display device 12 either to output only the first set of images or the second set of images according to the input signal, or to output the first set of images and the second set of images sequentially. The first polarization lens 18 receives and allows the first set of images passed from the liquid crystal module 14. The second polarization lens 20 disposed on a side of the first polarization lens 18 receives and allows the second set of images passed from the liquid crystal module 14.

A liquid crystal molecule of the twisted nematic liquid crystal layer 22 as mentioned above is a nematic liquid crystal. The twisted nematic liquid crystal layer 22 having a stereoscopic spiral arrangement has different twisted angles according to the disposition of the liquid crystal molecule. In this embodiment, this type of liquid crystal molecule substantially forms a stereoscopic spiral arrangement twisted 90 degrees between the first transparent electrode 28 and the second transparent electrode layer 30 while the power source 32 does not input an electric field to the first transparent electrode layer 28 and the second transparent electrode layer 30. Thus, if the display device 12 outputs a polarized image having a polarization angle to the twisted nematic liquid crystal layer 22, the polarized image rotates and proceeds in the direction of the spiral arrangement of the inner nematic liquid crystal molecule so that the polarization angle of the polarized image is offset by 90 degrees after passing through the twisted nematic liquid crystal layer 22. On the contrary, when the power source 32 inputs an electric field to the first transparent electrode layer 28 and the second transparent electric layer 30, the nematic liquid crystal molecule in the twisted nematic liquid crystal layer 22 arranges parallel to the direction of the electric field between the first transparent electrode layer 28 and the second transparent electrode layer 30. Therefore, when the display device 12 outputs a polarized image having a polarization angle to the twisted nematic liquid crystal layer 22, the polarized image proceeds along the gap of the nematic liquid crystal molecule, so that the polarized image passes through the twisted nematic liquid crystal layer 22 impartially. In summary, the control unit 16 controls the power source 32 to input an electric field to the first transparent electrode layer 28 and the second transparent electrode layer 30 for the purpose of controlling whether or not the polarized image outputted by the display device 12 is offset by 90 degrees after passing through the twisted nematic liquid crystal layer 22.

Figure 3:
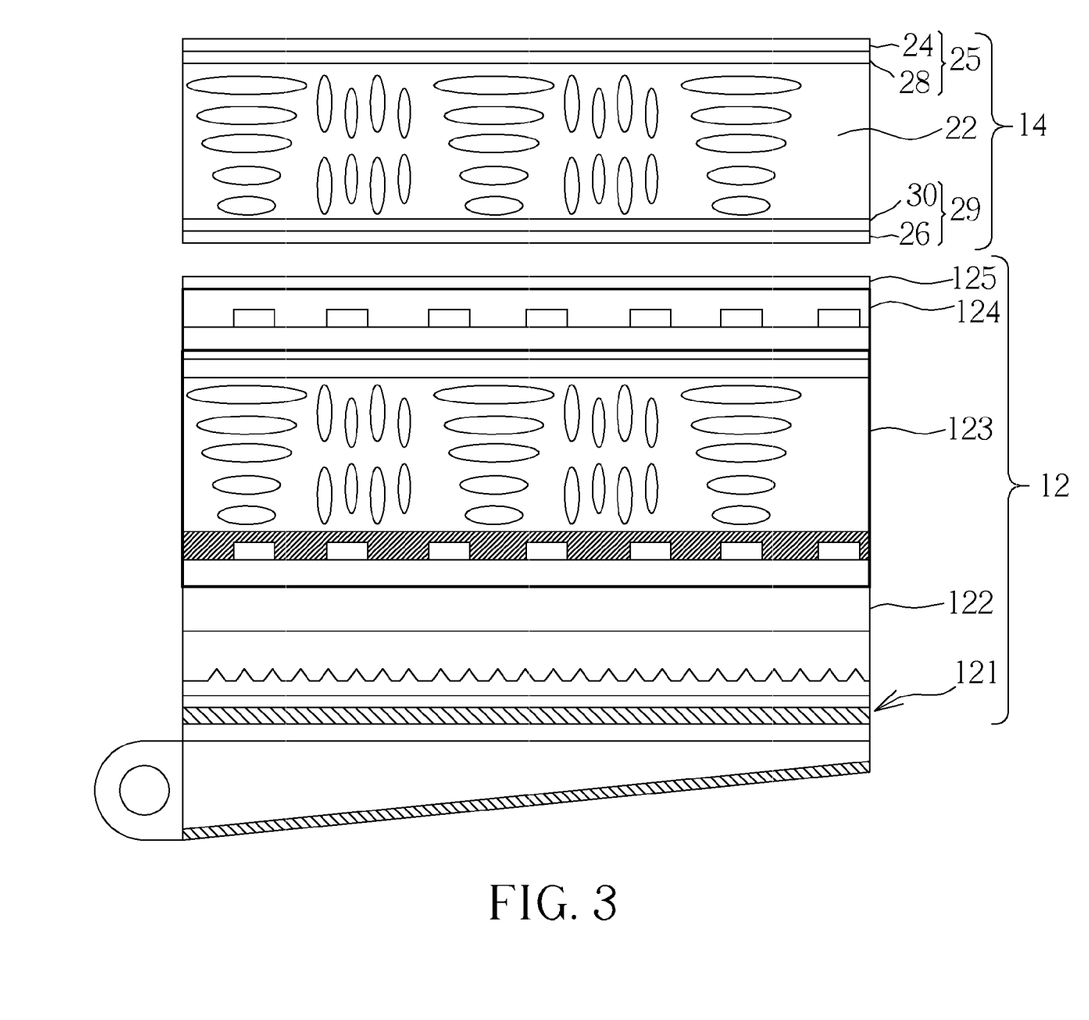
FIG. 3 is a diagram of a structure of the display device and the liquid crystal module in FIG. 1.

As mentioned above, the images output by the display device 12 must be modulated through polarization processing. If an image output by the display device 12 is non-polarized, the image is still non-polarized after passing through the twisted nematic liquid crystal layer 22 and unable to undergo the effect of the polarization angles mentioned above. According to the embodiment of the present invention, the display device 12 can be a common display which can output polarized images directly, such as a thin-film transistor liquid crystal display or a liquid crystal on silicon projector. Detailed description of motivation for the image processing system 10 is explained on the premise that the display device 12 is a thin-film transistor liquid crystal display. Please refer to FIG. 3. FIG. 3 is a diagram of a structure of the display device 12 and the liquid crystal module 14 according to FIG. 1. As shown in FIG. 3, the display device 12 comprises a back light 121, a first polaroid 122, a twisted nematic liquid crystal layer 123, a chromatic filter 124, and a second polaroid 125.

Figure 4:
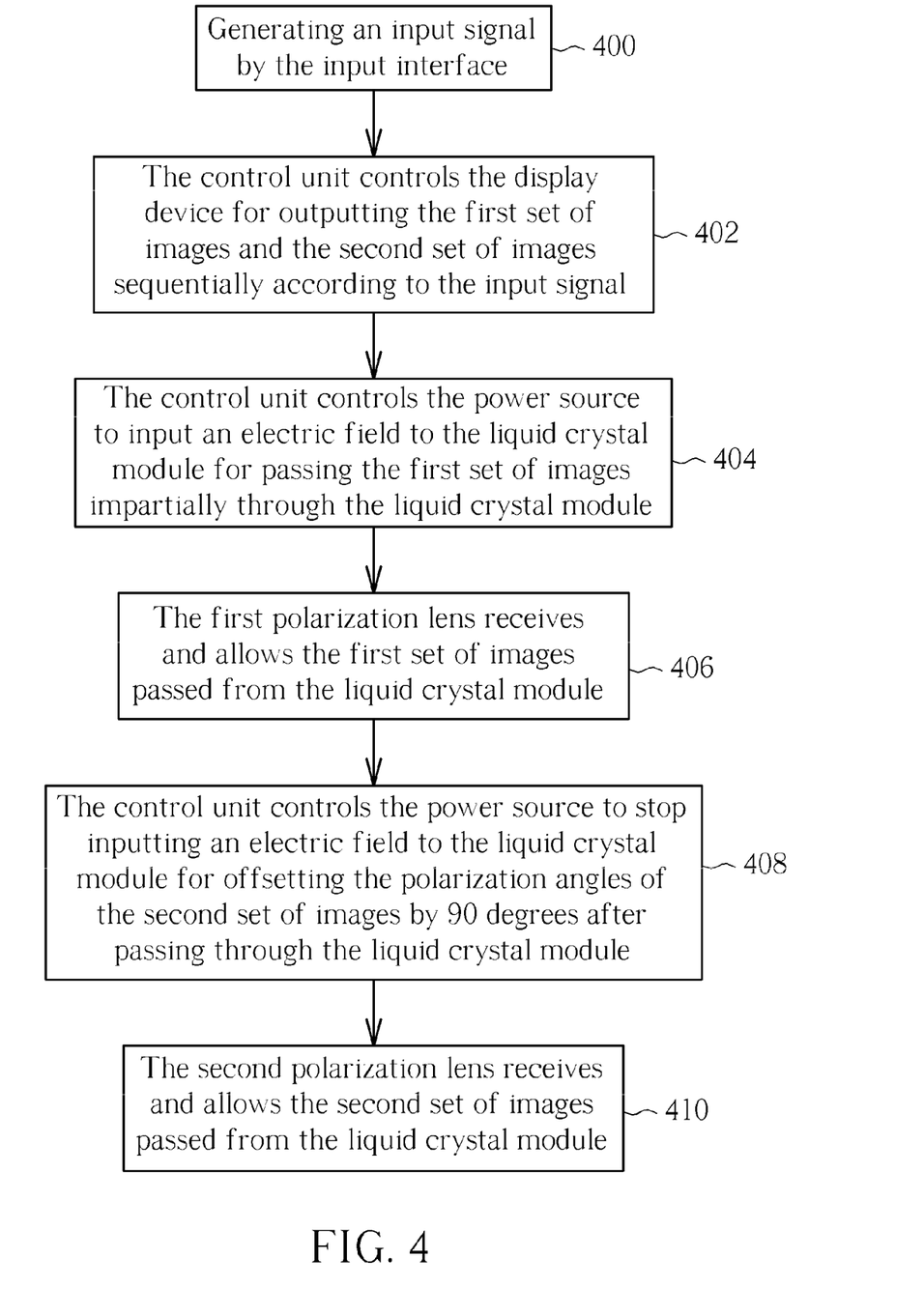
FIG. 4 is a method of the image processing system capable of changing a polarization angle of a polarized image in FIG. 1.

Please refer to FIG. 4. FIG. 4 is a method of changing the polarization angle of the polarized image for use in the image processing system 10. The method comprises the following steps.

STEP 400: Generate an input signal through the input interface 38;

STEP 402: The control unit 34 controls the display device 12 for outputting the first set of images and the second set of images sequentially according to the input signal;

STEP 404: The control unit 34 controls the power source 32 to input an electric field to the liquid crystal module 14 for passing the first set of images impartially through the liquid crystal module 14;

STEP 406: The first polarization lens 18 receives and allows the first set of images passed from the liquid crystal module 14;

STEP 408: The control unit 34 controls the power source 32 to stop inputting an electric field to the liquid crystal module 14 for offsetting the polarization angles of the second set of images by 90 degrees after passing through the liquid crystal module 14; and STEP 410: The second polarization lens 20 receives and allows the second set of images passed from the liquid crystal module 14.

At the beginning, in STEP 400, when the user inputs an order for watching stereoscopic images through the input interface 38, the input interface 38 generates and transmits a corresponding input signal to the control unit 34 for controlling the display device 12 to output the first set of images and the second set of images being stored in the memory unit 36 according to the input signal (STEP 402). The content of the first set of images and the content of the second set of images are substantially identical but differ in the visual angles. In other words, the first set of images is recorded according to the visual angles of the user's left eye, and the second set of images is recorded according to the visual angles of the user's right eye. The image output procedure of the display device 12 is as follows. First, the beams generated by the back light 121 pass through the first polaroid 122 and are modulated by polarization (meaning every single molecule of each polarized beam has similar characteristics). Then, the polarized beams pass through the twisted nematic liquid crystal layer 123. Along with the description above, the arrangement of the inner nematic liquid crystal molecule of the twisted nematic liquid crystal layer 123 is influenced by the electric field. The polarization angles of the polarized beams experience relative variations after passing through the twisted nematic liquid crystal layer 123 so as to have different polarization angles. The polarized beams display various colors and directions after passing through the chromatic filter 124 which has red, blue, and green subpixels. The polarized beams have different brightness after passing through the second polaroid 125, and thereby compose a color image. It is easy to see that the display device 12 utilizes the beams provided by the back light 121 for performing the above procedures and showing the first set of images and the second set of images having same polarization angles after passing through the second polaroid 125.

In STEP 402, the first set of images and the second set of images can comprise at least one first image and at least one second image, respectively. Thus, the display device 12 can show the first image in the first set of images and the second image in the second set of images sequentially in turn. For example, the display device 12 may show a frame of the first image first, and then show a frame of the second image. The display device 12 may show a plurality of first images in the first set of images and a plurality of second images in the second set of images sequentially but irregularly. For example, the display device 12 may show two pages of the first image first, and then show three pages of the second image, and so on. Whichever manner the display device 12 mentioned above shows the first set of images and the second set of images in, the display device 12 can achieve the effect of showing a continuous image through vision persistence if the speed of image display of the display device 12 (e.g. thirty frames per second) is higher than the reaction speed of the human eye.

It is assumed that the first set of images and the second set of images sequentially outputted by the display device 12 are the horizontal polarization images, and the display device 12 shows the first image in the first set of images and the second image in the second set of images sequentially in turn at a display speed of thirty frames per second. The control unit 34 controls the power source 32 to input an electric field to the first transparent electrode layer 28 and the second transparent electrode layer 30 for passing the first set of images through the twisted nematic liquid crystal layer 22 impartially (STEP 404), and stops the power source 32 from inputting an electric field to the first transparent electrode layer 28 and the second transparent electrode layer 30 for offsetting the polarization angles of the second set of images by 90 degrees after passing through the twisted nematic liquid crystal layer 22 (STEP 408). For that reason, the first set of images remain horizontal polarized images after passing through the twisted nematic liquid crystal layer 22, and the second set of images are modified as vertical polarized images after passing through the twisted nematic liquid crystal layer 22. Then, it can be known by STEP 406 and STEP 410 that the first polarization lens 18 receives and allows the first set of images passed from the liquid crystal module 14, and the second polarization lens 20 disposed on a side of the first polarization lens 18 receives and allows the second set of images passed from the liquid crystal module 14. In this embodiment, the first polarization lens 18 is relative to the horizontal polarization lens of the left eye of the stereoscopic glasses worn by the user so as to allow the left eye of the user to view the first set of images of horizontal polarization from the liquid crystal module 14, and the second polarization lens 20 is relative to the vertical polarization lens of the right eye so as to allow the right eye of the user to view the second set of images of vertical polarization from the liquid crystal module 14. When the user wears the stereoscopic glasses composed of the first polarization lens 18 and the second polarization lens 20, the left eye of the user can view the first image in the first set of images from the liquid crystal module 14 via the first polarization lens 18 first, and the right eye of the user can view the second image in the second set of images from the liquid crystal module 14 via the second polarization lens 20 second. The frame of the first image and the frame of the second image can be matched as a stereoscopic image by version persistence in the user's brain at the display speed of thirty frames per second of the display device 12, and so on. Therefore, the user can view the continuous stereoscopic image matched by the first set of images and the second set of images through the stereoscopic glasses composed of the first polarization lens 18 and the second polarization lens 20.

In addition, if the user wishes to view a flat image (non-stereoscopic image), the user merely inputs an instruction for viewing the flat image through the input interface 38, and the input interface 38 generates and transmits a corresponding input signal to the control unit 34. Then, the control unit 34 controls the display device 12 to output only the first set of images or only the second set of images stored by the above memory unit 36 according to the input signal. Therefore, users can view flat images outputted by the display device 12 without wearing the stereoscopic glasses.

Figure 5:
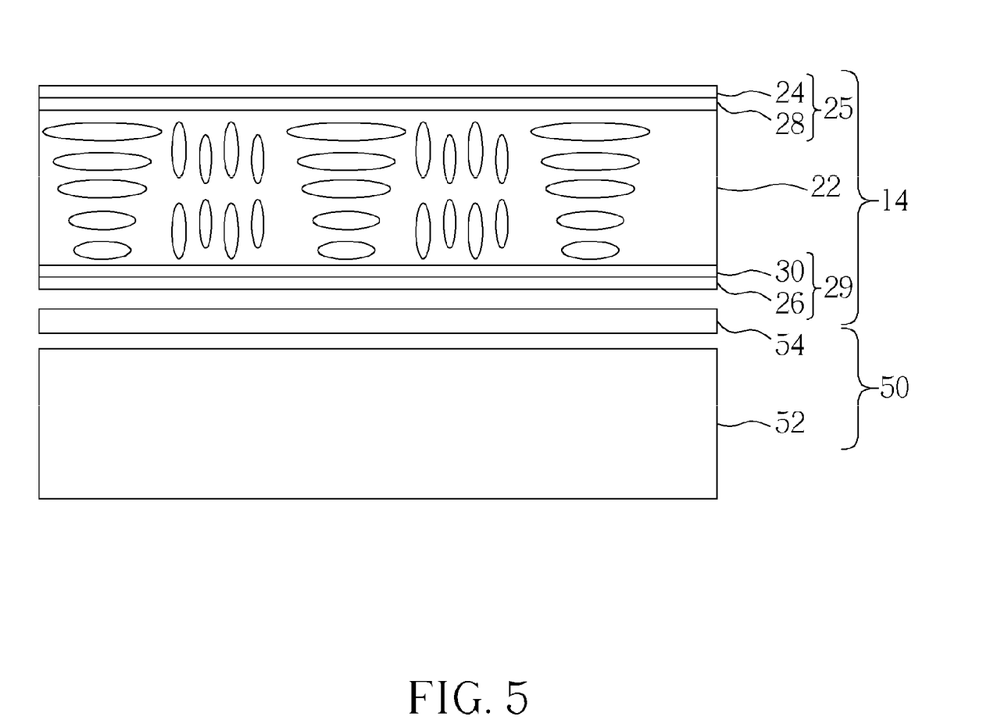
FIG. 5 is a diagram of the placement of the display device and the liquid crystal module according to a second embodiment of the present invention.

Please note, the liquid crystal module 14 as described above is suitable for a non-polarized image display. Namely, the display device 12 can employ the non-polarized image display and the polaroid to achieve the effect of outputting the polarized image. For example, please refer to FIG. 5. FIG. 5 is a diagram of placement of the display device 50 and the liquid crystal module 14 according to a second embodiment of the present invention. Elements of the second embodiment and the elements of the first embodiment having like reference numerals have same function or relative position, and are not described again for brevity. The second embodiment differs from the first embodiment in installation of the polaroid. The display device 50 comprises a non-polarized image display 52 and a polaroid 54. The polaroid 54 is disposed between the liquid crystal module 14 and the non-polarized image display 52. Therefore, the control unit 34 controls the non-polarized image displayer 52 to output the first set of images and the second set of images which can have the polarization angles after passing through the polaroid 54, sequentially. Common examples of non-polarized image displays are cathode ray tubes, plasma display panels, digital light processing projectors, etc.

Figure 6:
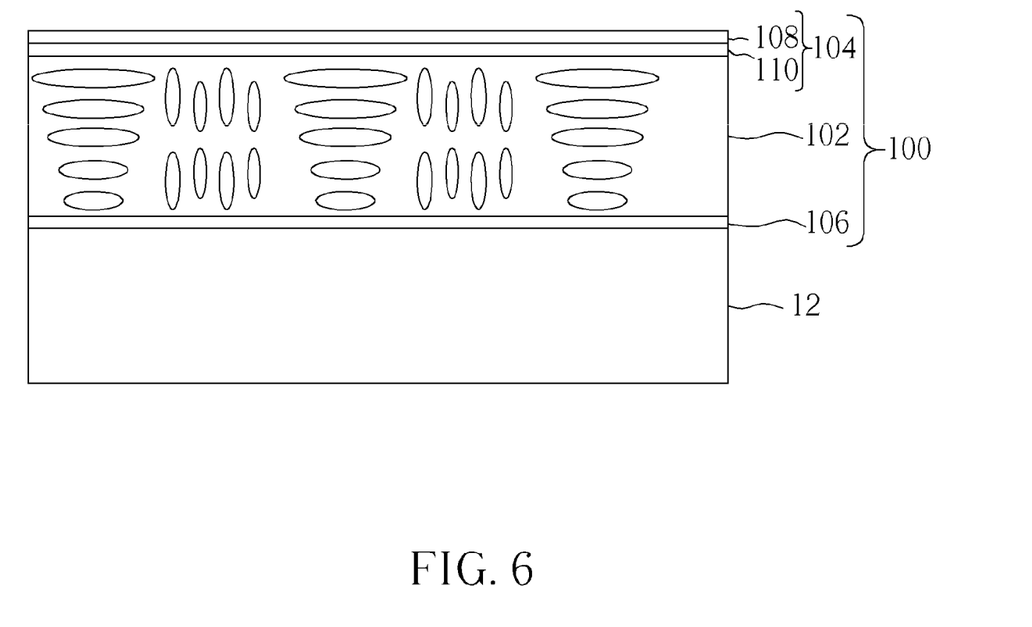
FIG. 6 is a diagram of the placement of the display device and the liquid crystal module according to a third embodiment of the present invention.

Finally, please refer to FIG. 6. FIG. 6 is a diagram of placement of the liquid crystal module 100 and the display device 12 according to a third embodiment of the present invention. Elements mentioned in the third embodiment and the first embodiment having like reference numerals have the same function or relative position. In this embodiment, the display device 12 is a liquid crystal display device such as a thin-film transistor liquid crystal display. As shown in FIG. 6, the liquid crystal module 100 comprises a twisted nematic liquid crystal layer 102, a transparent electrode structure 104, and a first transparent electrode layer 106. The transparent electrode structure 104 is utilized to fix the twisted nematic liquid crystal layer 102 and the first transparent electrode layer 106 on the liquid crystal display device 12. The transparent electrode structure 104 comprises a transparent base 108 and a second transparent electrode layer 110. The transparent base 108 is disposed on a side of the twisted nematic liquid crystal layer 102. The transparent base 108 is composed of transparent material, such as glass or a plastic. The second transparent electrode layer 110 is disposed between the twisted nematic liquid crystal layer 102 and the transparent base 108. For the same reason, the transparent electrode structure 104 can not only be a combination of two of the above different structural elements (the transparent base and the transparent electrode layer), but can also be designed as a single layer element, such as a single transparent electrode layer. The structural design can be adopted to fit practical requirements. The first transparent electrode layer 106 is connected to the twisted nematic liquid crystal layer 102 and a side of the liquid crystal display device 12 where the first set of images and the second set of images are outputted. Thus, the third embodiment differs from the first embodiment and the second embodiment mentioned above. The difference is omission of the second transparent base 26 from the liquid crystal module 100 in the third embodiment, which cuts down the cost of manufacturing the display device and the liquid crystal module alone. The operating procedure of how the user may view the stereoscopic image and the flat image is the same as the first embodiment and the detailed description is omitted herein for simplicity.

In contrast to the prior art, the embodiments of the present invention control the power source to modify the arrangement of the liquid crystal molecule in the liquid crystal layer, then offset the polarization angles of the passed polarized images to achieve the purpose of different eyes viewing the images with different visual angles when wearing the corresponding polarizing glasses. For this reason, the image processing system of the present invention is suitable for all display devices, whether a polarized image display (such as a thin-film transistor liquid crystal display, or a silica-base liquid crystal projector, etc.) or a non-polarized image display (such as a cathode-ray tube, a plasma display panel, or a digital light processing projector, etc.). In such a manner, convenience in practical application is raised greatly.

Those skilled in the art will readily observe that numerous modifications and alterations of the device and method may be made while retaining the teachings of the invention.

What is claimed is:

1. An image processing system comprising:
   a display device for outputting a first set of images and a second set of images sequentially, the first set of images and the second set of images being of different visual angles but same polarization angles after being output by the display device;
   a liquid crystal module disposed on a side of the display device where the first set of images and the second set of images are outputted, the liquid crystal module comprising:
   a twisted nematic liquid crystal layer;
   a first transparent electrode structure disposed on a first side of the twisted nematic liquid crystal layer; and
   a second transparent electrode structure disposed on a second side of the twisted nematic liquid crystal layer; and
   a control device electrically coupled to the liquid crystal module and the display device, the control device comprising:
   a power source electrically coupled to the first transparent electrode structure and the second transparent electrode structure; and
   a control unit electrically coupled to the power source for controlling the power source to input an electric field to the two transparent electrode structures for passing the first set of images impartially through the twisted nematic liquid crystal layer, and stopping the power source from inputting an electric field to the two transparent electrode structures for offsetting the polarization angles of the second set of images by 90 degrees after passing through the twisted nematic liquid crystal layer.

2. The image processing system of claim 1, wherein the first transparent electrode structure comprises:
   a first transparent base disposed on the first side of the twisted nematic liquid crystal layer; and
   a first transparent electrode layer disposed between the twisted nematic liquid crystal layer and the first transparent base.

3. The image processing system of claim 1, wherein the first transparent electrode structure is a single transparent electrode layer.

4. The image processing system of claim 1, wherein the second transparent electrode structure comprises:
   a second transparent base disposed on a second side of the twisted nematic liquid crystal layer; and
   a second transparent electrode layer disposed between the twisted nematic liquid crystal layer and the second transparent base.

5. The image processing system of claim 1, wherein the second transparent electrode structure is a single transparent electrode layer.

6. The image processing system of claim 1 further comprising:
a first polarization lens for receiving and allowing the first set of images passed from the liquid crystal module; and
a second polarization lens disposed on an end of the first polarization lens for receiving and allowing the second set of images passed from the liquid crystal module.

7. The image processing system of claim 1, wherein the control device further comprises:
a memory unit electrically coupled to the control unit for storing the first set of images and the second set of images; and
an input interface electrically coupled to the control unit for supplying an input signal, the control unit controlling the display device for outputting the first set of images or the first set of images and the second set of images sequentially according to the input signal.

8. The image processing system of claim 1, wherein the display device comprises:
a non-polarized image display; and
a polaroid disposed between the liquid crystal module and the non-polarized image display, the first set of images and the second set of images having the polarization angles after passing through the polaroid.

9. The image processing system of claim 8, wherein the non-polarized image display is a cathode-ray tube, a plasma display panel, or a digital light processing projector.

10. The image processing system of claim 1, wherein the first set of images and the second set of images comprise at least one first image and at least one second image, respectively.

11. A method of modifying polarization angle of a polarized image, the method comprising:
outputting a first set of images and a second set of images of different visual angles to a liquid crystal module sequentially, the first set of images and the second set of images having same polarization angle after output;
inputting an electric field to the liquid crystal module for passing the first set of images impartially through the liquid crystal module; and
stopping inputting the electric field to the liquid crystal module for modifying the polarization angle of the second set of images by 90 degrees after passing through the liquid crystal module.

12. The method of claim 11 further comprising:
utilizing a first polarization lens to receive and allow the first set of images passed from the liquid crystal module; and
utilizing a second polarization lens to receive and allow the second set of images passed from the liquid crystal module.

13. The method of claim 11 further comprising:
generating an input signal for determining an output sequence for outputting the first set of images and the second set of images of different visual angles to the liquid crystal module before outputting the first set of images and the second set of images of different visual angles to the liquid crystal module.

14. The method of claim 11, wherein outputting the first set of images and the second set of images of different visual angles to the liquid crystal module sequentially comprises utilizing a polarized image display to output the first set of images and the second set of images of different visual angles to the liquid crystal module sequentially.

15. The method of claim 11, wherein outputting the first set of images and the second set of images of different visual angles to the liquid crystal module sequentially comprises:
utilizing a non-polarized image display for outputting the first set of images and the second set of images of different visual angles sequentially;
passing the first set of images and the second set of images outputted by the non-polarized image display through the polaroid for giving the first set of images and the second set of images the same polarization angle; and
conveying the first set of images and the second set of images having the same polarization angle to the liquid crystal module.

16. The method of claim 11, wherein outputting the first set of images and the second set of images of different visual angles to the liquid crystal module sequentially comprises outputting a plurality of first images in the first set of images and a plurality of the second images in the second set of images of different visual angles to the liquid crystal module sequentially.

17. An image processing system comprising:
a liquid crystal display device used for outputting a first set of images and a second set of images sequentially, the first set of images and the second set of images having different visual angles, respectively, but same polarization angles after being output by the liquid crystal display device;
a liquid crystal module disposed on a side of the liquid crystal display device where the first set of images and the second set of images are outputted, the liquid crystal module comprising:
a twisted nematic liquid crystal layer;
a transparent electrode structure disposed on a first side of the twisted nematic liquid crystal layer; and
a first transparent electrode layer connected to a second side of the twisted nematic liquid crystal layer; and
a control device electrically coupled to the liquid crystal module and the liquid crystal display device, the control device comprising:
a power source electrically coupled to the first transparent electrode layer and the transparent electrode structure; and
a control unit electrically coupled to the power source for controlling the power source to input an electric field to the first transparent electrode layer and the transparent electrode structure for passing through the first set of images through the twisted nematic liquid crystal layer impartially, and for stopping input of the electric field from the power source to the first transparent electrode layer and the transparent electrode structures for offsetting the polarization angles of the second set of images by 90 degrees after passing through the twisted nematic liquid crystal layer.

18. The image processing system of claim 17, wherein the transparent electrode structure comprises:
a transparent base disposed on a first side of the twisted nematic liquid crystal layer; and
a second transparent electrode layer disposed between the twisted nematic liquid crystal layer and the transparent base.

19. The image processing system of claim 17, wherein the transparent electrode structure is a single transparent electrode layer.

20. The image processing system of claim 17 further comprising:
a first polarization lens for receiving and allowing the first set of images passed from the liquid crystal module; and
a second polarization lens connected to a side of the first polarization lens for receiving and allowing the second set of images passed from the liquid crystal module.

21. The image processing system of claim 17, wherein the control device further comprises:
  a memory unit electrically coupled to the control unit for storing the first set of images and the second set of images; and
  an input interface electrically coupled to the control unit for supplying an input signal, the control unit controlling the liquid crystal display device for outputting the first set of images or the first set of images and the second set of images sequentially according to the input signal.

22. The image processing system of claim 17, wherein the first set of images and the second set of images comprise at least one first image and at least one second image, respectively.

* * * * *